United States Patent [19]

Dischert

[11] 4,170,024
[45] Oct. 2, 1979

[54] TELEVISION CONTROL SYSTEM

[75] Inventor: Robert A. Dischert, Burlington, N.J.

[73] Assignee: RCA Corporation, New York, N.Y.

[21] Appl. No.: 894,011

[22] Filed: Apr. 6, 1978

[30] Foreign Application Priority Data

May 24, 1977 [GB] United Kingdom ............... 22804/77

[51] Int. Cl.² .......................... H04N 5/26; H04N 9/04
[52] U.S. Cl. ..................................... 358/41; 358/210
[58] Field of Search ........................ 358/10, 41, 210

[56] References Cited

U.S. PATENT DOCUMENTS

| | | | |
|---|---|---|---|
| 3,215,774 | 11/1965 | Ikegami | 178/6.8 |
| 3,463,962 | 8/1969 | Bazin | 315/24 |
| 3,916,436 | 10/1975 | Marey et al. | 358/1 |

FOREIGN PATENT DOCUMENTS 1925815 12/1970 Fed. Rep. of Germany ........... 358/210

OTHER PUBLICATIONS

Sound Vision Broadcasting, vol. 11 #2, pp. 3-11, Summer 1970-Great Britain.

*Primary Examiner*—Robert L. Richardson
*Attorney, Agent, or Firm*—Eugene M. Whitacre; Paul J. Rasmussen; Robert L. Troike

[57] ABSTRACT

A control system for a color television camera having a plurality of adjustable controls includes a multiple address Random Access Memory (RAM) for storing, in a binary code, signals representing the control values for the camera. Addresses for the control value signals are supplied to the memory to thereby provide, during each field, in binary form, the control value signals from the memory. A digital to analog converter responsive to the binary signals provides pulse amplitude modulated signals representing, in analog form, the control values. The pulse amplitude modulated signals are coupled to appropriate temporary storage devices in the camera each field for storing the control values. The camera includes means connectable to a setup control unit for only modifying the control values in the RAM when desired and not interfering with the original adjusted value unless a change is desired.

19 Claims, 14 Drawing Figures

TELEVISION CONTROL SYSTEM

BACKGROUND OF THE INVENTION

In the present TV color camera equipment, setup adjustments are located in many different places. Some of the setup adjustments are in the camera head, some are located in the base equipment when used and some are remoted to the base equipment from the camera head to allow monitoring facilities to make the adjustment. Most of the setup adjustments are located in the camera head or in the base equipment when used. The number of setup adjustments is approximately 100. These setup adjustments are generally potentiometer type adjustments and the potentiometers are tightly packed together and usually involve concentric controls. This tight packing of the controls adds to the size and weight of the base equipment and the camera and further complicates the adjustments. For small cameras, it is convenient to move the camera to the monitoring facilities and make adjustments in the head. In larger cameras, some of the adjustments have to be remoted to the base equipment where the monitoring facilities are available. Remoting of the controls typically involves separate conductors through a cable to each of the potentiometers. This in itself can cause instability. The labor involved in setting up the camera is considerable and therefore it is also desirable to find a more convenient means for performing the setup adjustments. In addition, it is desirable to provide a system by which automatic control may be provided.

SUMMARY OF THE INVENTION

A system for a television device having a source of TV sync signals for providing a plurality of adjustable controls to the device includes a multiple address digital memory for storing in a binary digital code the control values for the television device under a separate address. An address generator provides the multiple addresses during each field to the memory to thereby provide during each field in binary from the control values for the device. A digital to analog converter coupled to the output of the memory provides amplitude level signals representing these control values. These amplitude level signals are coupled during each field to appropriate temporary storage devices in the television device. The digital memory is coupled to means for selectively modifying the binary code in the memory for adjusting the controls to the device.

DESCRIPTION OF INVENTION

Figure 1:
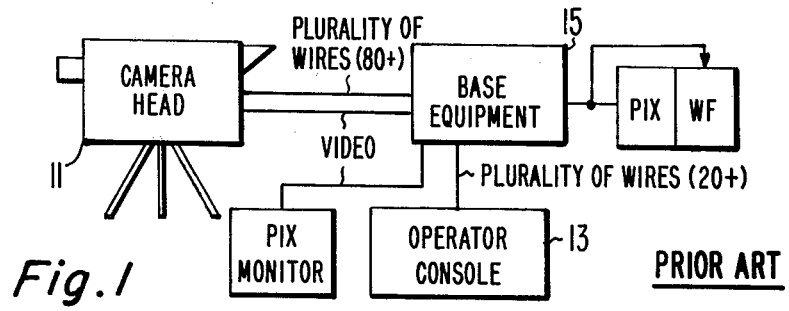
FIG. 1 is a block diagram of a camera system according to the prior art.

Referring to FIG. 1, there is illustrated a camera system according to the prior art. A camera and control system for the camera comprises, for example, a camera head 11 including image pickup tubes, precision optical mounts and mechanical assemblies and appropriate electronics to scan an image to produce video signals representing the image and subsequently to process and encode these video signals. Present television camera equipment includes many setup and operational adjustments. The operational adjustments are made at the operator console 13 while the camera is performing in an operational mode. These adjustments typically include iris, black level, gain and balance controls. The setup adjustments, which are typically made prior to the full operational mode, may be made at the camera head 11, and in some equipments may be made at an extension of the camera head referred to as the base equipment 15. The total number of setup adjustments, for example, for setting up a color television camera is approximately 100. In the small cameras, the adjustments are usually made in a camera head and for larger cameras, the setup adjustments are usually made in the base equipment and the camera head. The remoting of setup controls typically requires a separate conductor for each control between the base equipment 15 and the camera head 11. The remoting of the operator controls includes a separate conductor for each control between the operator console 13 and the camera head 11, or in the case where base equipment is included, a separate conductor for each control function between the operator console 13 and the base equipment 15 and between the base equipment 15 and the camera head 11. The control values are determined by the settings of control potentiometers coupled to each conductor. The video from the camera head 11 is coupled to a picture monitor at the operator console and at the base equipment. Typically, there is also a waveform monitor and a vectorscope at the base equipment location.

This prior art type of system has many disadvantages. A first disadvantage is the required cable system with over 80 wires between the base equipment (when used) and the camera head and about 20 wires between the operator control console and the camera head or between the operator console and the base equipment. A second disadvantage is that the control potentiometers for the setup controls have to be closely packed either in the camera head or in the base equipment. When the number of controls is about 100, this greatly affects the size and weight of the camera or the base equipment. In an effort to reduce the size, these controls are small, highly packed and include concentric control knobs. This further complicates an already difficult job in setting up a TV camera. Further, there is a requirement that each camera or associated base equipment, in a studio having a plurality of cameras, must have these controls. Further, this arrangement does not lend itself to automatic adjustment or setup of the camera which would reduce the labor cost in operating the cameras.

Figure 2:
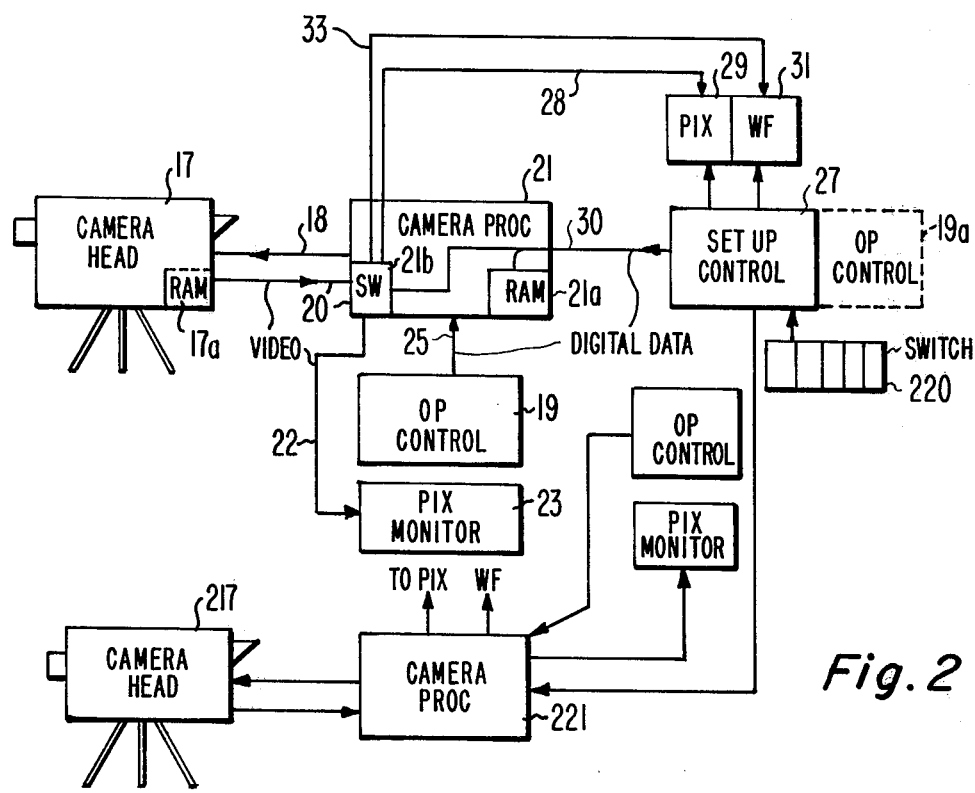
FIG. 2 is a block diagram of the camera system according to one embodiment of the present invention.

In accordance with the teaching herein, this type of system is dramatically changed by the system in FIG. 2. The system of FIG. 2 includes the camera head 17 and an operator control console 19. In place of the base equipment, however, there is a device referred to herein as a camera processor 21. The camera processor includes a Random Access Memory (RAM) 21a which stores in the camera processor 21 the setup and operator control voltages which are used to set up the camera head 17 and are used to set up the camera processor 21. These setup control voltages are converted to pulse amplitude modulated signals (PAM) and most are coupled via a coaxial transmission line 18 to the camera head 17. The Random Access Memory 21a in the camera processor 21 stores in digital format the control voltages for the camera setup and operation. The operator control console 19 has an associated picture monitor 23. The video from the camera head 17 is coupled via separate transmission lines 20 and 22 to the picture monitor 23 via switch 21b in camera processor 21. The operator control console 19, as will be described in more detail later, is responsive to potentiometer control settings (voltage levels) at the operator control console 19 to provide an 8-bit digital signal representative of those potentiometer settings. The operator control console also contains switch functions. The 8-bit digital data representations of the potentiometer settings of the console 19 are sequentially provided to the camera processor 21 via data link 25 wherein they are stored in the memory 21a and are sequentially converted to pulse amplitude modulated (PAM) signals which are sequentially coupled via line 18 to the electronic circuitry in the camera head 17.

As mentioned previously, setup controls for the camera are stored in the Random Access Memory in the camera processor 21. The RAM 21a stores in a digital format the amplitude values which are sequentially converted in the camera processor 21 to pulse amplitude modulated signals (PAM) and coupled to either controls in the camera processor 21 or to the about 100 controls in the camera head 17. The signals to the camera head 17 are pulse amplitude modulated and are sequentially provided (time multiplexed). These signals are sent via a single transmission line 18 rather than the 80-wire cable. A setup control unit 27 coupled to the camera processor 21 via a twisted pair 30 is used to modify the stored setup control data in the RAM 21a to provide adjustment to the setup controls. At the setup control unit location are picture and waveform monitors 29 and 31. The video from the camera head 17 is coupled via lines 28 and 33 to these monitors. The setup procedure is such that only four control values are modified in the RAM 21a during any given television field interval. This setup control unit 27 may be disconnected and have its own power supply so that it may be utilized together with different camera processors such as 221 and camera heads such as 217 in the same studio. Although the system according to the embodiment described herein has the camera processor 21 separate from the camera head, they together are considered to be the camera. The camera head 17 may have its own RAM 17a (indicated by dashed lines) so that it may be disconnected from the camera processor without losing its setup control values. The timing of the entire system uses the television horizontal sync and vertical sync signals located in the camera.

In a typical television field, there are for the NTSC system 262½ lines with a horizontal sync pulse for each line. The camera head 17, camera processor 21, setup control 27 and operator control 19, and other equipment contain, for scanning purposes, these synchronizing pulses.

Figure 3:
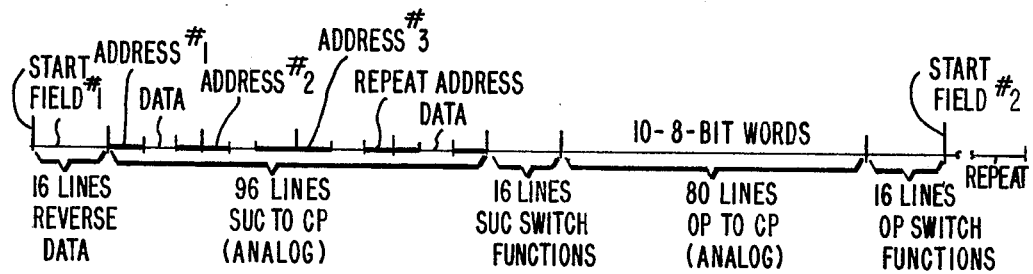
FIG. 3 illustrates the data flow between the operator console and the setup control unit and the camera processor of FIG. 2 during a field period.

Referring to FIG. 3, there is illustrated the sequence of the data flow between the operator console 19 and camera processor 21 and between the setup control unit 27 and the camera processor 21 during a single television field period. During the time period for the first 16 horizontal lines of video following vertical sync, there is reversed data or return data in the system from the camera processor 21 back to the operator console and from the camera processor 21 back to the setup control unit 25. The data is in the form of 1 data bit per television line. There are 16 data bits for this total return data time period. For the time period covering the next 96 horizontal lines, there is provided the setup control analog correction data from the setup control unit 27 to the camera processor 21 for modifying the stored data in the RAM. This 96-line interval consists of four sections of three 8-bit words. During the first eight horizontal line intervals of each section, there is provided an 8-bit address (one bit each line) identifying the control to be modified. This is followed by 8-bit correction data (one bit each line) to be applied to that memory location. This 8-bit correction data is followed by a repeat of that 8-bit address. The total time interval for one correction is 24 horizontal line time periods. Similarly, the second section of correction data provides an 8-bit address for the second control to be modified, the 8-bit change data for the second control followed by a repeat 8-bit address. Data and addresses for the two other controls are provided in the same manner for the next 48 horizontal line time period. This makes up a total of 96 television horizontal line time periods. Following this, there is, during the next 16 horizontal lines, one data bit per horizontal line for providing switch function controls from the setup control unit 27 to the camera processor 21. These switch function controls set up such conditions as the picture and waveform monitoring, and such conditions as beam off, shading off, focus off, beam control, align rock, overscan, etc. For the next 80-horizontal line time periods, there is provided ten 8-bit data words at the rate of one data bit per line from the operator control console 19 to the camera processor 21. Since there are 8-bit words which provide the analog level for each of the controls, the ten controls are provided over 80 horizontal line time periods. In addition to the 80 line time interval for analog controls from the operator control console 19, there is a 16 horizontal line interval used for the operator switch functions from the operator control console. These switch control functions are sent at the rate of 1 bit per horizontal line. These operator control bits provide such functions as lens cap information, power, automatic white balance, etc.

Figure 4:
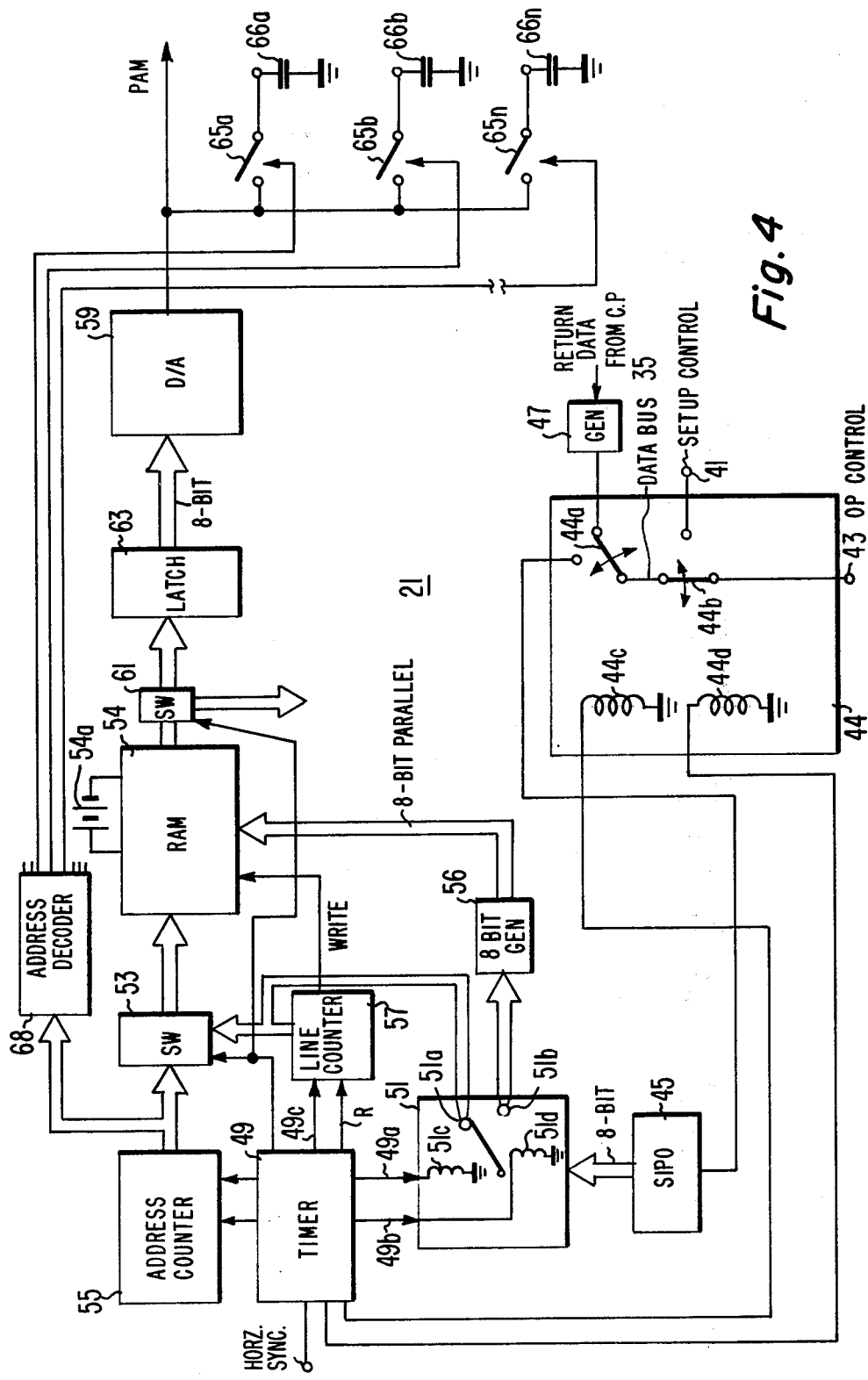
FIG. 4 is a system block diagram of the camera processor of FIG. 2.

Referring to FIG. 4, there is illustrated for example a block diagram of a portion of the camera processor 21 according to one embodiment of the present invention. Terminal 41 in FIG. 4 is coupled to the setup control unit 27 via line 30 (FIG. 2) and terminal 43 in FIG. 4 is coupled to the operator control console 19 via line 25 (FIG. 2). These terminals are coupled to a common data bus 35 in FIG. 4. These terminals 41 and 43 are coupled through a switcher 44 to the input of a serial in-parallel out converter (SIPO) 45. The timing of the data in FIG. 3 represents the timing on the data bus 35. A sensor generator 47 in the camera processor sends the return data to the operator control unit or setup control unit. The sensor senses conditions in the camera such as lens caps on etc. and camera processor conditions and sends this information to the operator control and setup control. Lens cap information may be sent along with the video during video sync. Switch 44 has a pair of switching arms 44a and 44b. When switch 44a is de-energized for example it is contacting the output of generator 47 and when energized, contacts the input to serial in parallel out (SIPO) converter 45. Contact arm 44b when energized is coupled to the operator control unit terminal 43 and when de-energized is coupled to the setup control unit terminal 41. An operator control 19a as indicated by dashed lines in FIG. 2 is usually located at the setup control unit so the operator controls may be adjusted during setup adjustment. In this condition, the part of the switch 44 with control arm 44b and coil 44d is located at the setup control unit 27 and the data bus 30 in FIG. 2 is the data bus 35 in FIG. 4.

The camera processor 21 includes a timer 49 which is responsive to the horizontal and vertical sync signals of the television camera system to reset the timer 49 every field and provide control signals at the horizontal line rate. For the first 16 horizontal sync signals, no energizing potentials are sent from the timer 49 to coil 44c to energize contact arm 44a so that the signals in the sensor 47 are applied through contact arm 44a. For the first eight of these 16 horizontal line intervals, energizing potentials are applied from timer 49 to coil 44d and switch 44b is energized to couple the reverse data to the operator control console terminal 43. For the second eight line intervals or lines 9 through 16, the timer 49 provides no energization to both coils 44c and 44d so switch contacts 44a and 44b provide the reverse data signals to the setup control via terminal 41. For the remainder of the field period, timer 49 provides energizing potentials to coil 44c and switch contact 44a is positioned to provide both the setup control unit and operator control outputs to the serial in parallel out converter (SIPO) 45. For the horizontal line period from line 17 through lines 129, the timer 49 provides no energizing signal to coil 44d so contact arm 44b provides coupling between the setup control unit via terminal 41 to the serial in parallel out converter (SIPO) 45. For the horizontal line time period from line 130 to the end of the field, coil 44d is energized moving arm 44b to couple the signals from the operator control via terminal 43 to the serial in parallel out converter (SIPO) 45. The output from serial is parallel out converter (SIPO) 45 is an 8-bit parallel digital code. For the first eight horizontal line periods no output is provided from the converter 45. For the horizontal line period from line 17 through 112, (96 line periods of analog setup control) the timer 49 switches via a switcher 51 (contact 51a) the 8-bit parallel word output from the SIPO converter 45 to switch 53 at the input of the RAM 54 for permitting changes to the stored program in the RAM. The timer control is applied via lead 49a to coil 51c. The output signal from the SIPO converter 45 is in the form of an 8-bit parallel address followed by an 8-bit parallel data, followed by a repeat of the 8-bit parallel address. The SIPO converter 45 waits for 8 horizontal line periods while the 8 bits are serially loaded in the register of the converter before providing an output during one horizontal time period.

The switcher 51, at the termination of the 96 horizontal line periods of analog information plus 8 (a total of 112+8 horizontal lines at timer 49) switches the first setup switch output from the SIPO converter 45 to an address generator 56 via contact 51b for the setup switch functions. The eight extra lines allow for the SIPO converter to be loaded. This switch 51b is energized by energizing potentials from timer 49 to line 49b and coil 49d. There are two 8-bit setup switch function words (16 lines) from the output of the SIPO converter 45. The generator 56 converts each bit (which corresponds to a setup switch function) of the two 8-bit words from the SIPO converter 45 to an 8-bit word for each switch function. If, for example, the first bit of the 8-bit word from SIPO converter 45 is a logic "1," then eight logic "1's" are generated in parallel at generator 56. If the second bit is a logic "0" then eight logic "0" bits are generated in parallel. The switch function information which has been placed in an 8-bit digital format for each function is applied to the RAM 54 in address locations provided by line counter 57. The switch function data is converted to PAM at digital to analog converter 59. The PAM output from the converter 57 is therefore either full "on" or full "off" since the input is either all logic "1" or "0." The PAM output from converter 57 is coupled to the camera head 17 or controls in the camera processor. The line counter 57 in the camera processor is responsive to the line sequence from the timer 49 for generating sequential addresses for each line (via lead 49c) to the RAM 54 for providing the addresses for the memory location for the switch functions for the setup control, the operator analog controls and the operator unit switch functions. The line counter 57 also provides a write control signal to the RAM 54 for writing all signals associated with the address therefrom. The line counter 57 is reset each field. In this manner all of the operator controls and the setup switch functions are rewritten into the RAM each field. If no data is present during a given field these controls return to zero.

The control analog signals from the operator console 19 are converted into 8-bit parallel words at SIPO converter 45 and applied to the RAM 54 via switch 51 and 53 with each 8-bit word written into the memory according to the address provided by the line counter 57 which is in response to the horizontal line counter provided by timer 49. The switch 51 is in the position 51a shown to couple the 8-bit word from SIPO converter 45 directly to switch 53. An output signal via lead 49a from timer 49 is provided for the horizontal line time period from lines 128 through 208. The line counter 57 provides write addresses and a write control signal during this control period.

The operator switch function control values are stored in the RAM 54 in the same manner as the setup switch functions. The timer 49 via lead 49b switches the 8-bit parallel word from the SIPO converter 45 representing eight switch functions to 8-bit generator 56 via switch 51 (contact 51b) controlled by timer 49. The generator 56 generates eight bits of either all "1" or "0" in parallel format for each bit of the 8-bit word and writes these into the RAM 54 according to the memory locations dictated by the line counter 57.

The output from the RAM 54 consists of all 8-bit parallel words. An 8-bit word is provided out of the RAM 54 each horizontal line period according to 8-bit read addresses provided by address counter 55. The counter 55 is incremented during each horizontal line interval from timer 49 to provide sequentially read addresses to the RAM 54 and is reset after each field (during vertical sync). The output from the RAM 54 is coupled through switch 61, latched in latch 63, and then converted to pulse amplitude modulated signals by the digital to analog converter 59. Th 8-bit data word from the RAM 54 is read for example during the first eight microsecond time period of each horizontal line into the latch 63. The remaining time period of the memory of each line is allocated for the write cycle described previously. The read cycle for each field begins during the first horizontal line interval.

Figure 5:
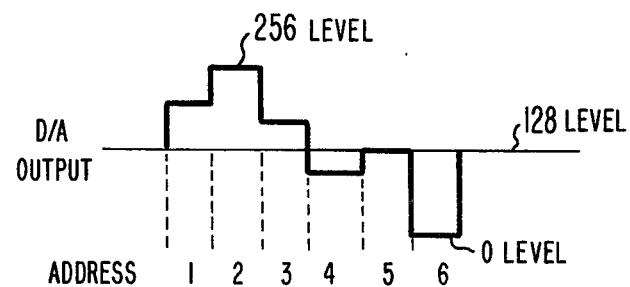
FIG. 5 illustrates the output from the digital to analog converter in the camera processor.

FIG. 5 illustrates the data output from addresses 1, 2, 3, 4, 5 and 6 for example from digital to analog converter 59. There are for example 256 D.C. levels from the digital to analog converter 59. The zero level is a minus term as indicated for example at address 6 and the 128 level would be the center level at address 5. The first address is at about the 200 level.

In the camera processor 21 of FIG. 4, there are about ten sampler switches 65a, 65b through 65n and corresponding ten storage capacitors 66a, 66b through 66n for selected RAM addresses for temporarily storing analog information at these selected addresses between fields. The output signals from these capacitors are coupled to appropriate processor circuitry. An address decoder 68 is responsive to the output from the counter 55 for sequentially energizing all of the sampler switches 65a through 65n in the proper sequence to close the appropriate switch each field so that the voltage stored in each of the capacitors corresponds to the digital information stored at the corresponding RAM memory location (demultiplexing the PAM output). The RAM 54 includes a battery 54a for maintaining the values stored in the RAM even if power is disconnected. The voltage charged in the capacitors 65a through 65n is proportional to the 256 D.C. levels and these voltage levels are maintained between the TV fields or about 1/60 of a second.

Figure 6:
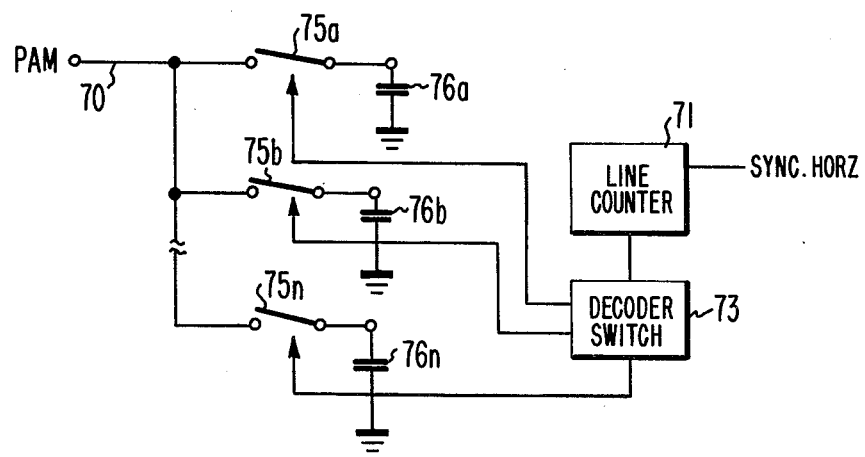
FIG. 6 illustrates the demultiplexing of the pulse amplitude modulated signal in the camera.

Referring to FIG. 6, there is illustrated a portion of the camera head. The pulse amplitude modulated (PAM) data stream from the camera processor is at terminal 70. A line counter 71, responsive to TV horizontal sync, counts the horizontal lines and provides an output signal to a switch decoder 73. The decoder 73 in response to the count causes closure of the proper sampler switch 75a through 75n (demultiplexing the PAM output) to refresh the temporary storage capacitors 76a through 76n. The storage capacitors are each coupled to the appropriate camera control circuitry. There are about 100 such setup controls in the camera head and about 10 operator controls.

Although relays and switches are shown in FIGS. 4 and 6, this is by way of illustration only. Certainly in the case of relay they would preferably be replaced by electronic gating circuits in order to provide the fast switching required.

Figure 7:
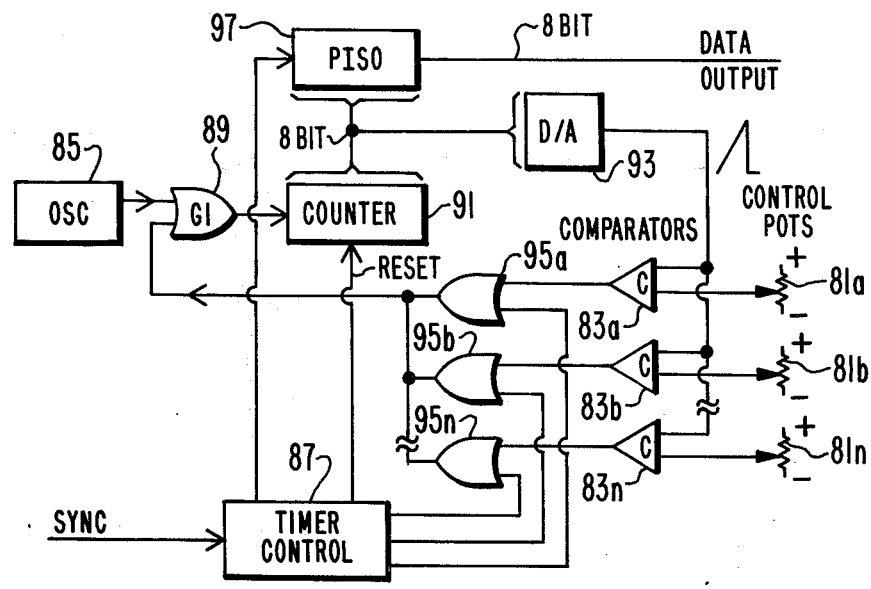
FIG. 7 is a block diagram of the analog to digital converter at the operator console.

FIG. 7 illustrates how the operator control signals are generated according to one embodiment of the present invention. The operator controls are provided for example by ten control potentiometers 81a through 81n. For example, these potentiometers are each coupled across a voltage source in which the setting of the potentiometer provides a selected voltage from each of the potentiometers 81a through 81n to comparators 83a through 83n. An oscillator 85 is used as a high rate clock to clock a digital counter 91 via NAND gate 89. The output of the counter 91 is converted by digital to analog converter 93 which generates a ramp voltage as the counter is clocked by the oscillator. This ramp voltage is compared at the comparators 83a through 83n with the voltage from the potentiometers. At the point where the ramp crosses the potentiometer voltage, an output is provided to one of the AND gates 95a through 95n. The gates at 95a through 95n are sequentially enabled each eight horizontal line periods from the timer control 87 which is a line counter responsive to each of the horizontal sync pulses. When one of the gates 95a through 95n is enabled, a signal is coupled to NAND gate 89 to stop the counter. The count in the counter is the encoded control voltage and is sent to the output line via a parallel in serial output buffer 97. The speed of the oscillator 95 is such that a full count or maximum output level of the ramp may be reached in one data bit time or during one horizontal line interval. The outputs from the comparators 83a through 83n are switched by the gates 95a through 95n in turn with the control sequence. For example, gate 95 is switched during the first eight horizontal time intervals following setup switch functions, gate 95b is switched during the second eight horizontal time period etc. The counter 91 is reset after each value of counter data is shifted out of the parallel in serial output converter 97 and the cycle is repeated for each value of control data. The timer control 87 is used to control the sequence reset, the counter 91, and to shift the parallel in serial output buffer 97.

Figure 8:
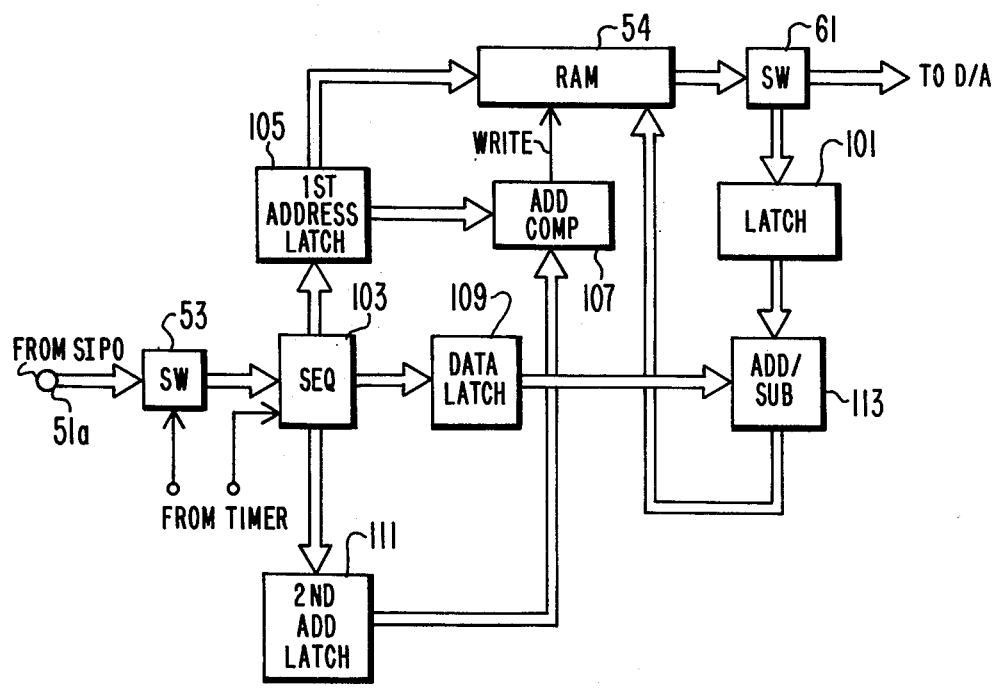
FIG. 8 is a functional block diagram of the system for modifying the control values in the Random Access Memory during the setup time interval.

Referring to FIG. 8, there is illustrated the manner in which the setup control signals digitally stored in the RAM 54 may be changed during the write time period of the memory by the setup control unit 27. Basically, the serial data stream from the setup control is applied to the serial in and parallel out converter 45 as discussed previously. FIG. 3 illustrates the sequence of this serial data. As mentioned previously, first in the sequence is an 8-bit digital address followed by 8-bits of digital data followed by a repeat of the 8-bit digital address. The 8-bit digital data represents a change in the D.C. level rather than the absolute D.C. level to be stored in the RAM 54. When in the modifying mode during the write time period of each line after the eight μsec time period to latch the data in latch 63, switches 53 and 61 are in the positions by signals from timer 49 delayed 8 μsec to couple the first address into the RAM 54 from terminal 51a of switch 51 and to read the output at the first address from the RAM 54 into a data latch 101 as illustrated in FIG. 8. The first 8-bit parallel address from the SIPO converter 45 is applied via switch 53 and sequencer 103 to a first address latch 105 which in turn is coupled to an address comparator 107 and to the read input of RAM 54. The 8-bit parallel binary data which follows (which contains the change information) is applied to data latch 109 via sequencer 103. When the repeat 8-bit address appears following the data, it is coupled to second address latch 111. The output from the second address latch 111 is compared to the first address latch at address comparator 107 and if they are identical, a write signal from the address comparator 107 is applied to the RAM 54. The original data level stored in the RAM 54 applied to latch 101 is coupled to an adder/subtractor 113. The change in level from the data latch 109 is also applied to an adder/subtractor 113. The data in the latch 101 is then increased or decreased by the amount in the data latch 109 and when there is a comparison of addresses at comparator 107, this new level from the adder/subtractor 113 is written into the RAM 54 at the appropriate address. The two addresses of the memory are desirable to ensure proper addressing even in the presence of noise on the data line. Both addresses must be the same before the writing can take place. The most significant bit from latch 109 determines whether the adder/subtractor unit 113 adds or subtracts. This is repeated for the other three addresses to be updated each field. The reading of the RAM 54 is the same as before in connection with FIG. 4. If the data from the adder/subtractor 113 approaches zero (minimum level) or near 256 (maximum level) that level causes the generation of a flashing signal which is coupled during the reverse data interval back into the setup control unit 27 to flash the alphanumeric display in the setup unit to be described later. If the change is such that the subtractor makes the output data less than zero the data level stays at zero and if by addition, it is greater than 256 it stops at 256. The sequencer may be a switch coupled to the timer for switching sequentially the output to latch 105, 109, and 111 in response to every eight horizontal sync pulses.

While in the above described arrangement the setup control unit is discussed as being used with a single camera or camera processor and a camera head, the same setup control unit may be used for several cameras or camera processors and camera heads. In this way, there is not only the reduction to four knobs for controlling the setup of one camera (camera processor and camera head) these four knobs can be used for several cameras. For example, the multi-camera system may be as shown in FIG. 2 with the output from the setup control switch by delegate switch 220 from camera processor 21 to camera processor 221. The setup control video from camera head 21 is then coupled to the picture and waveform monitors 29 and 31 in the same manner discussed previously in connection with FIG. 2. The setup control unit 27 may send a video blanking signal to the video control switcher 143 in the camera (switch 21b in FIG. 2) processor 21 to cause disabling of the video from the video processor 21 to the picture and waveform monitor. The operator control unit 19a would also be coupled to the camera processor 221. Also, an automatic setup unit may be used in place of the setup control unit of FIG. 2 and the same automatic setup unit may be switched from one camera (camera head and camera processor) to another using the delegate switch 220. The switching between cameras may also be done using the sending the loop through technique described in British Provisional Application No. 22806/77, filed May 30, 1977 entitled "Monitoring System with Sending End Signal Loop Through" of Robert Adam Dischert and Lawrence Joseph Thorpe.

It is to be noted that while the above described system was designed using an NTSC system of 262 ½ lines per field, it is equally applicable to any of the other TV systems such as PAL, PALM, or SECAM. The RAM used herein has 256 memory locations (8-bit addressable) and stores 8-bit data. The NTSC system provides more horizontal line sync signals each field than needed for addressing the RAM. The PAL and SECAM systems provide even more lines per field.

Figure 9:
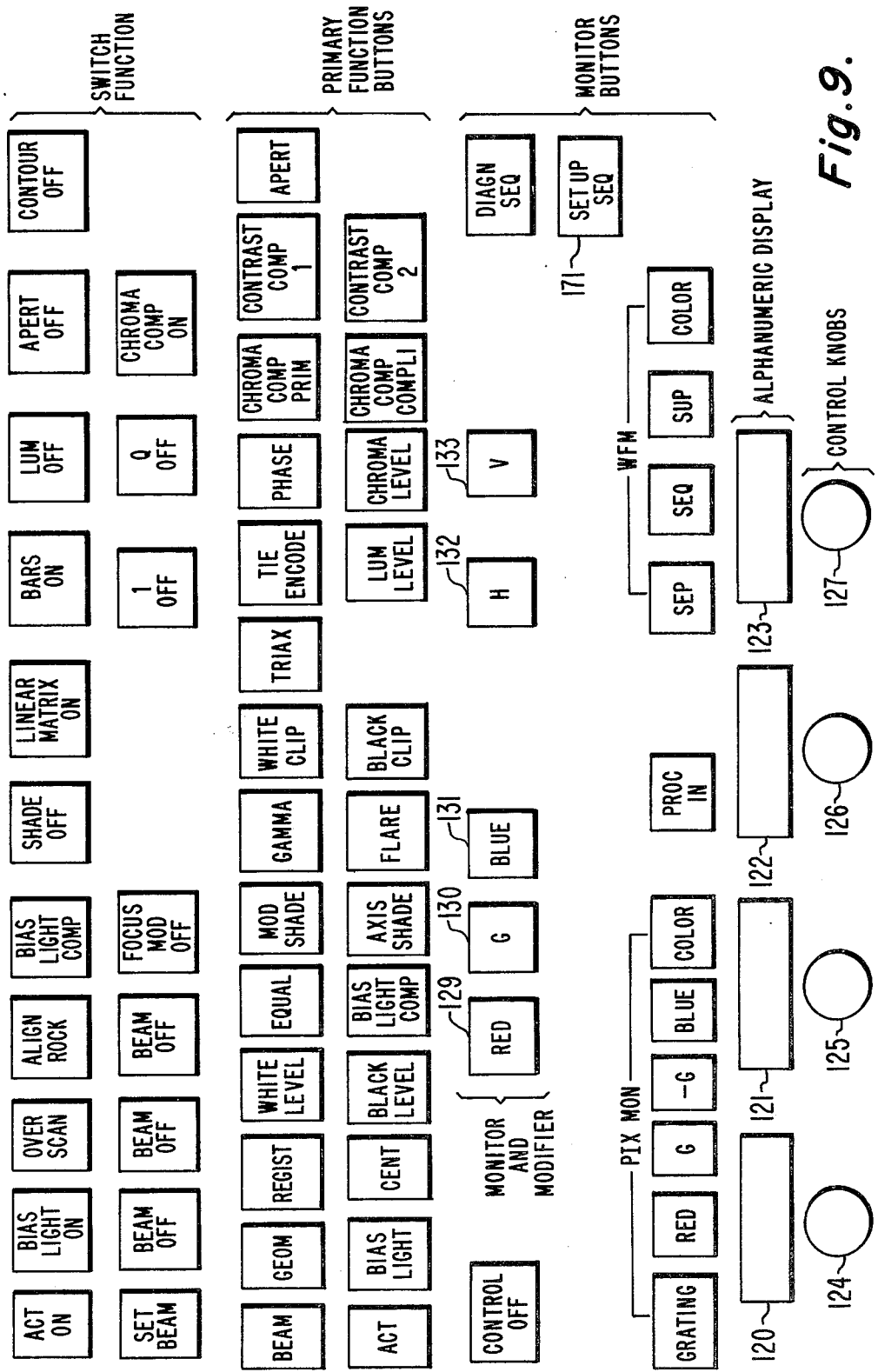
FIG. 9 is a top panel view of the setup control unit.

Referring to FIG. 9, there is illustrated the setup control panel. There are three sets of buttons—the monitor buttons, primary mode function buttons and the switch function buttons. In addition, there are four alphanumeric displays 120 through 123 and four control knobs 124, 125, 126 and 127. There are two types of switch function buttons: one type is conditioning buttons which when depressed provide in the serial data stream after the 96 horizontal line interval of analog correction data to the RAM the sixteen 1 bit per line switch information. The switch buttons are arranged to illuminate when the function stated on the button is utilized. The other type of switch function buttons are the mode buttons which when depressed provide an 8-bit address followed by 8-bits of all logic "1's" or "0's" followed by a repeat of the 8-bit address. These buttons cause the switched conditions to be stored in the RAM 54 during the 96 line horizontal line interval for analog controls. These conditions remain in the camera processor even though the setup unit is disconnected.

Each of primary function buttons represent at most the four controls which are to be handled simultaneously each field. The primary function buttons switch the controls which are to be adjusted by the control knobs. The alphanumeric display identifies each of the controls.

The bottom row of buttons on the panel operate the monitors. As seen in FIG. 9, there is the picture monitor and the waveform monitor button switches. The bottom row, left hand side buttons (labeled PIXMON) switch the picture monitor. These picture monitor buttons are coupled only to the picture monitor and when lighted indicate what is shown on the picture monitor. The bottom right buttons control the waveform monitor (WFM). These waveform monitor buttons are coupled both directly to the waveform monitor and are coupled via the data bus to the camera processor 21. As shown in FIG. 2, the video from the camera head 17 is coupled to the camera processor 21 which includes a switch 21b for controlling the video to the picture monitor 29 or the waveform monitor 31.

Figure 10:
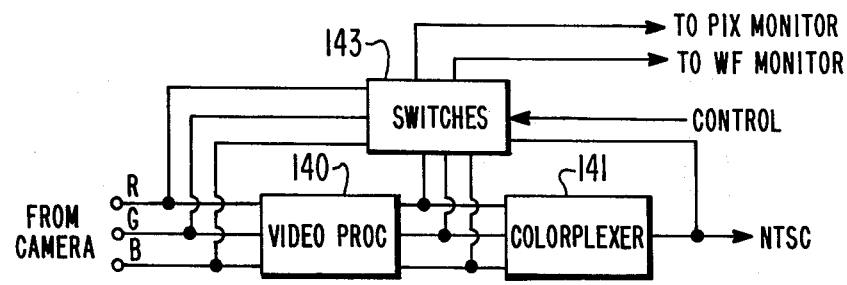
FIG. 10 illustrates a monitor switching in the camera processor of FIG. 2.

Referring to FIG. 10, there is illustrated a more detailed diagram of this switch. The camera processor 21 receives the red, blue and green pictures from the camera head 17 and applies them to a video processor 140 in the processor 21. The output from video processor 140 is applied to a colorplexer 141 to thereby form the total NTSC TV signal. A switcher 143 is coupled to the input and outputs of the video processor and the output of the colorplexer. The switcher is responsive to digital data from the data bus for controlling the signals to the monitors. The waveform monitor switches have the four modes of separate, sequential, superimposed and color. When the separate button is closed, a one data bit signal is sent to the switcher 143 for coupling one of the selected red, green or blue signals from the camera via the video processor 140 to the waveform monitor 31. When the superimposed or sequential switch button is depressed, the data bit signal causes the switcher 143 to switch the output from the video processor 140 consisting of all three color signals to be sent via switch 143 sequentially to the waveform monitor 31. When the sequential button is depressed, these three video signals are sequentially displayed from left to right and when the superimposed switch is depressed these video signals are displayed superimposed. When the color switch is depressed, the combined NTSC signal from the colorplexer 141 is applied via the switcher 143 to the waveform monitor. When the "PROC IN" button is depressed the input to the video processor is sent via the switcher to the picture and waveform monitor. The data bit signals sent to the switcher 143 from the waveform monitor push buttons are applied during the switch function interval by the setup control unit. The red, green or blue signal coupled to the picture monitor is controlled at switcher 143 by the switches 129, 130 and 131 on the panel. The lighting of the buttons associated with these switches indicates the condition being displayed. Also, the position of these red, green and blue switches determines which display is provided to the waveform monitor during the separate display period. The position of the red, green and blue switches generates a data bit which is applied during the switching interval to the switcher 143. The position of these red, green or blue button switches 129, 130 and 132 also provide part of the addresses into the memory for modifying the primary function being controlled. The H and V switches 132 and 133 selects the sweep rate of the waveform monitor. In the V position the waveform is displayed at the vertical sweep rate (the picture waveform from top to bottom appears from left to right) and the H position displays the waveform at the horizontal sweep rate (the horizontal waveform from left to right). The H and V buttons when depressed are coupled directly to the waveform monitor for switching its display and form part of the primary function address for the analog controls. The output signals from the H and V controls are not applied to the switcher 143. It is to be noted that the push buttons 129 through 133 on the panel not only control video to the monitors but also provide a part of the address identifying the function being adjusted.

As mentioned previously, the primary mode function buttons select a series of four setup control functions to be adjusted. For example, if the registration button is adjusted, the four control functions of centering, size, linearity and skew are displayed and adjusted by the control knobs 124, 125, 126 and 127. The monitoring buttons 129, 130, 131, 132 and 133 when lighted tell which of the six secondary functions of red, green or blue horizontal or red, green or blue vertical is being adjusted. As mentioned previously, the setup control provides an 8-bit binary address, an 8-bit binary data, followed by a repeat of the 8-bit binary address. The first 5 bits of each address of the four functions are selected by each of the primary function buttons and the remaining 3 bits of the address are selected by each of the monitor buttons 129 through 133.

Figure 11:
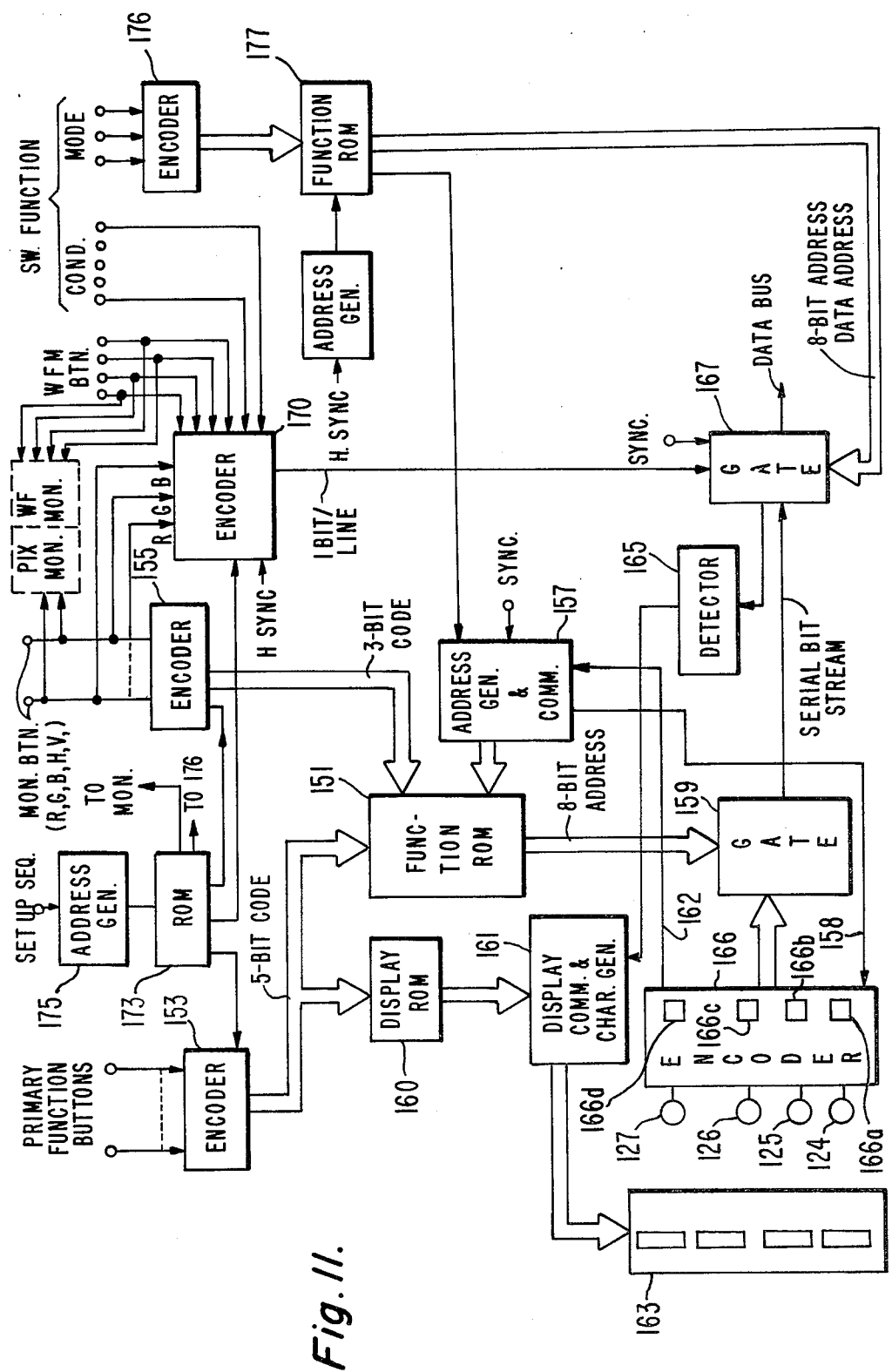
FIG. 11 is a functional block diagram of the setup control unit of FIG. 2.

Referring to FIG. 11, there is illustrated a functional block diagram of the setup control unit. A function ROM 151 (Read Only Memory) stores the appropriate addresses for each primary function to be performed. When a primary function button is depressed on the panel, an encoder 153 is responsive to the switch buttons and generates a 5-bit code corresponding to the primary mode button depressed. This code is applied to the function ROM 151. The monitoring and address modifying buttons 129 through 133 such as red, green and blue, horizontal, or vertical when depressed cause encoder 155 to generate a 3-bit code. This 3-bit code encoded by encoder 155 is sent to the ROM 151. The 5-bit code and the 3-bit code cause the ROM 151 to provide four 8-bit addresses to be controlled each field. For example, when the registration primary function switch button and the green switch button 130 are depressed the ROM 151 sequentially provides during each field the green video centering, size, linearity and skew addresses to be controlled by knobs 124, 125, 126 and 127. These four functions are sequenced by address generator and commutator 157. The four different addresses are applied each field to the gate 159 and corresponding changes from the four control knobs are sequenced to gate 159. As the knobs 124, 125, 126 and 127 are turned, a respectively associated up/down counter, 166a through 166d, counts the incremental movement during each field and sends this data to gate 159 with the proper address.

Figure 12:
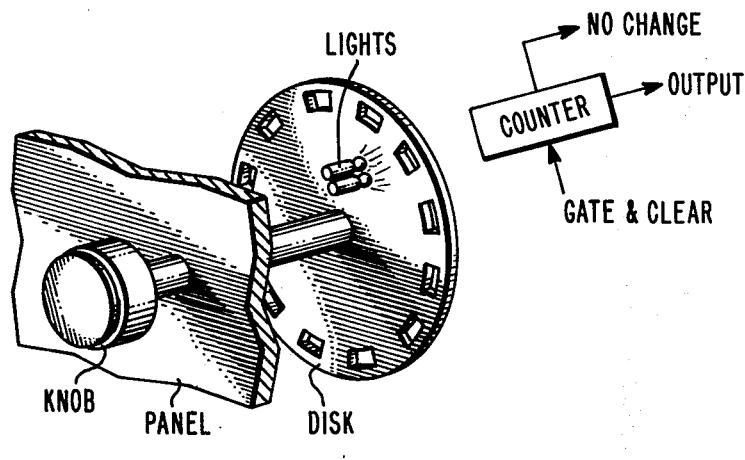
FIG. 12 illustrates the operation of the control knobs.

Referring to FIG. 12, when the knob is turned in one direction to add, an up/down counter goes from all zeros to 00000001, etc. If the knob is turned in the opposite direction, the counter in the first count goes to all 1's. Thereby, by looking at the most significant bit, the adder/subtractor 113 can tell whether to add or subtract. Also, if, for example, the knob is turned 25 increments in one second, this data is sent over several fields. Thus, the system appears, from an operational point of view, to function in real time. The knobs 124 through 127 have no stops since they only relate to changes to the data content. The data from the knobs is cleared each field after they are read. If there is no change, this condition is coupled to address generator and commutator 157 and the repeat address is not sent. The knobs 124 through 127 may be coupled to discs with clear and opaque areas around the periphery. See FIG. 12. A pair of closely spaced lights may be directed from one side of the disc and an impulse up/down counter is responsive to the light pulses each field to provide the accumulator function. The up/down counter includes two optical impulse sensitive detectors displaced to sense the direction and magnitude of the movement of the disc. A gating signal from commutator 157 enables the output from the counter.

The encoder 166 comprises four such up/down counters or accumulators 166a, 166b, 166c and 166d which four accumulator outputs are sequentially provided each field to the gate 159 in response to gating signals sent via four leads 158 from commutator 157. Each of the leads 158 are coupled to a gating input of a different one of the accumulators. The commutator 157 is responsive to the vertical sync signal for sequentially gating during each field the four addresses selected by the primary and monitoring buttons and for gating the data in the appropriate accumulator and for gating the repeat address following the data. If no data is present (no change in the knobs) a signal from the up/down counter or accumulator is sent via one of the four leads 162 to the commutator 157 to stop the repeat address. The data from the encoder 166 is in the form of an 8-bit code which is provided sequentially from the impulse up/down counters 166a through 166d to the gate 159. The commutator 157 provides a stop counter signal to the up/down counters or accumulators after the first address. The commutator 157 sequences the impulse up/down counters or accumulators 166a through 166d output during each field and provides a clear to these counters at the end of each field. The display ROM 160 is responsive to the 5-bit word from the primary function buttons and provides four addresses to the alphanumeric character generator 161. The alphanumeric character generator 161 is coupled to the appropriate display 163 to indicate the primary functions controlled by the knobs. The secondary information (i.e., from the red, green, blue, horizontal and vertical buttons) is indicated by the lighting of the buttons. The alphanumeric display 163 can be flashed when there is an out of range condition in the correction. For example, when the data out of the adder/subtractor 113 in FIG. 8 is near zero or 256, the reverse data in the serial bit stream is detected at detector 165 via gate 167 and is coupled to display generator 161. When the red, green or blue switches 129, 130 and 131 are depressed, this is encoded in the 1 bit per line encoder 170 which provides a logic "1" or "0" out of gate 167 during the setup control unit switch function interval. This switch output is also directly coupled to the monitors. Similarly, the waveform monitor switch buttons are coupled to encoder 170 which provides the 1 bit per line code during the setup control unit switch function interval to the camera processor. Similarly, the condition switch functions indicated by some of the top buttons on the panel are placed on the output data bus by being applied to encoder 170 and applied to gate 167. The mode switch buttons are coupled to an encoder 176 which sends a code to a function ROM 177 which identifies the mode switch being depressed. The function ROM 177 when a code is applied provides an 8-bit address, 8-bit data of all logic "1" or all "0" followed by a repeat address to gate 167 during the analog control interval (lines 17 to 113). See FIG. 3. The setup control unit includes a timer which, in response to the horizontal sync signals, cycles the commutator 157 and ROM 177 and controls the gate 167 during the switch function period to provide in the proper time sequence the red, green, blue, waveform and secondary switch function outputs to the camera processor.

There is also a sequencer button 172 on the control panel. The setup control unit includes a preprogram sequence for setting up the camera. This sequence button when depressed delegates the four controls for adjustments associated with a primary function, presets any condition in the camera system necessary for these function adjustments, switches appropriate monitor displays, presents appropriate identification via alphanumeric displays and instructs the operator as to the correct procedure and sequence of adjustments merely by the sequential pushing of the sequence button. The ROM 173 provides these appropriate addresses. When the sequence button is depressed, an address generator 175 provides an address to the ROM 173 which in turn generates the first binary code to the encoders 153, 155, 170 and 176 for providing the first group of addresses for the first primary function to be controlled, the proper signals to the monitors and switch condition for the first setup function to be adjusted. These functions are displayed and controlled in the manner described above with the adjustment done manually by adjusting the control knobs 124 through 127. After this first function has been adjusted, the operator pushes the sequence button causing a second address from generator 175 to the ROM 173 which sets up the preprogrammed second group of addresses of the second function to be corrected. The second function may be only modifying one of the 3-bit modifiers of red, green, blue or H or V from encoder 55 or it may be a setup switch condition. This is then corrected and the sequence button is again depressed for the next preprogrammed sequence of functions to be adjusted from the ROM 173. The ROM 173 and address generator 175 act to automatically set up the condition at the controls and monitor according to a recommended set up procedure when the setup sequence button is depressed. This continues until a complete setup is achieved. The setup controller also contains a preprogrammed diagnostic procedure with its own sequence pushbutton. This sequence will transmit digital data to the camera chain, instructing it to perform a series of video ties, and it will identify the location of the ties via the alphanumeric display.

It is to be noted that the camera processor system described in connection with FIGS. 2 through 10 may be preferably done using a microprocessor. For example, the system may use an RCA - CDP1802 microprocessor as described in the data sheet No. 1023 published by RCA Solid State Division, Somerville, N.J. The system in addition to the CDP1802 would include a RAM and a ROM as shown in FIG. 1 of the data sheet. The data input signal as in the previous case is applied to a SIPO converter using electronic gating circuits. The ROM tells the microprocessor what to do and contains the preprogrammed sequence which follows the sequence of FIG. 3. The microprocessor does the switching and timing function and is responsive to the horizontal sync pulses. The RAM is sequenced by the horizontal drive every line via the microprocessor. The 8-bit word from the RAM is latched in and applied to a digital to analog converter. The converted analog output from the digital to analog converter would be applied at the horizontal drive rate to the camera head or camera processor controls via the sampler switches. The ROM would also provide the appropriate address to address the decoder at the horizontal rate which would then switch the appropriate sampler switch to charge the appropriate capacitor as discussed previously. The writing into and reading out of the RAM may be done at different locations in the memory. The data stored may be transferred to a different address to be read out and in the process of this transfer from one location to another cause an operation to be done on the data. There may be one memory for normal conditions and one separate memory for special operations. The special operation memory may be written into from the first to return to normal operation.

The setup control unit may also use a microprocessor such as the above cited CDP1802 microprocessor. The microprocessor does the timing and knows when to put data out into the lines. The microprocessor system would include a RAM and a ROM. The input would be from the buttons or the knobs and this data comes in as a code. The microprocessor sees this code, looks in the ROM and looks for the appropriate address for that button which then sends the appropriate address to the RAM. The microprocessor looks at the up/down counter responsive to the knobs to see if there is a change. If there is any change in the setting of the knobs, this is placed in the appropriate location in the RAM. Sequencing of the ROM causes another address to be sent. The output is latched and converted from a parallel output to a serial output. The microprocessor is clocked so that every eight horizontal lines it transfers a grouping of data into the shift register (parallel in serial output converter).

Figure 13:
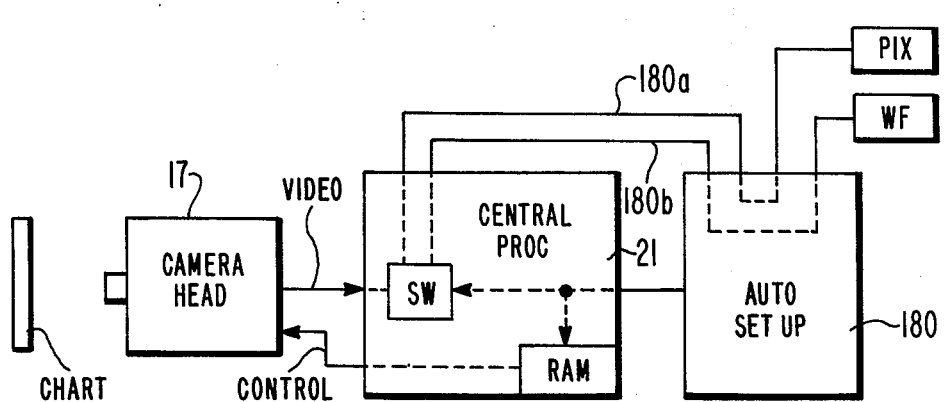
FIG. 13 is a block diagram of the automatic system.

The setup controls may also be done automatically as illustrated in connection with FIG. 13. Basically, the automatic control provides the same serial bit stream to the data bus previously provided by the setup control unit. Since the automatic system replaces the manual control knobs, the knobs are removed and the corrections to the functions are applied into the system via the serial data bus as in the case of the setup control. Referring to FIG. 13, the camera head 17 is viewing a chart positioned in a controlled manner relative to the camera head. This test chart can be a chart the camera is framed on or a chart built in the lens or optical system of the camera. The video is coupled to the camera processor 21 as discussed previously. This video is switched to the picture monitor and waveform monitor as discussed previously. See FIG. 10. This switching is done by the setup switch function address sent along the serial data bus from automatic setup unit 180. The separate picture and waveform monitor signals are also applied to the automatic setup unit 180 via leads 180a and 180b. In the automatic setup unit 180, these two video signals are compared to each other or to a reference for what is on the chart and determines the errors. The waveform monitor signal is used to supply the reference for the detectors and the picture monitor signals is used to supply the signal to be corrected. For example the system makes adjustments to the red and blue channels to match the green channel. This is accomplished by selecting the green video on the waveform monitor lead 180b. This signal is used as the reference and fed to one of the detectors 195, 196 or 197 in FIG. 14. The other signal (picture monitor) is used for the red or blue signal to be detected. The setup in this case is to make adjustments to match the green channel. An absolute setup system makes adjustments to the green channel. This is accomplished by feeding a reference signal from source 182 to the waveform monitor line input and the green to the picture line input. In addition the automatic setup unit 180 is capable of developing error signals in response to the lack of symmetry in a given one of the two video signals. From these errors are determined the correction signal for the setup functions. These corrections with the proper addresses are sent in the proper time slot as address-data-address (same as analog set up controls) during the 96 line interval to correct the RAM 54 as discussed above in connection with FIG. 8.

Figure 14:
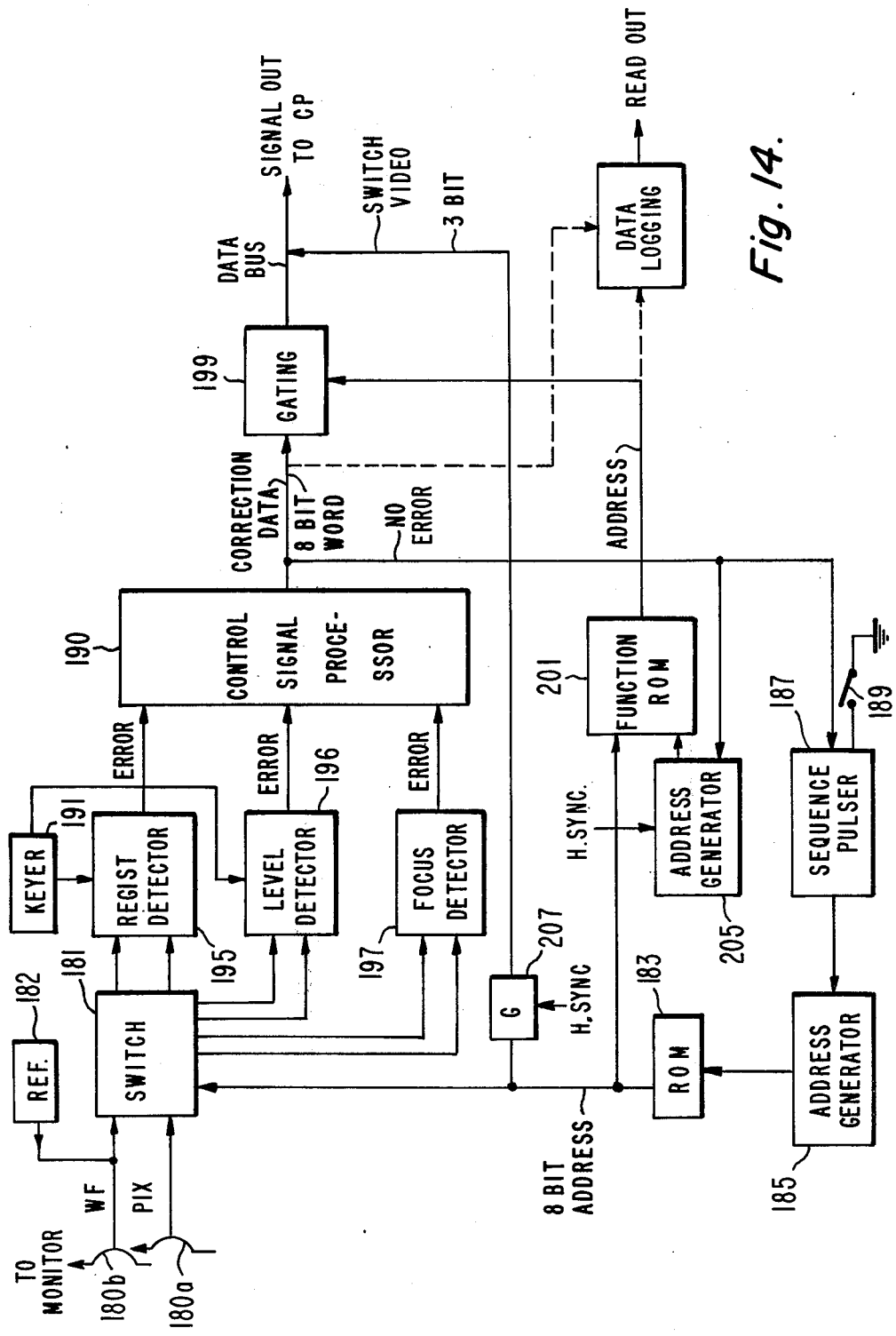
FIG. 14 is a block diagram of the automatic setup control unit.

Referring to FIG. 14, there is illustrated a functional block diagram of the automatic setup unit 180 for use in the system described above. The waveform and picture inputs are coupled to a switcher 181. The switcher 181 couples these two picture input signals to one of the appropriate detectors 195, 196 or 197 for measuring the errors. A ROM 183 is responsive to an address generator 185 for sequentially providing a digital address identifying the function to be adjusted. The address generator 185 is responsive to a sequence pulser 187. The sequence pulser 187 after initial turn on by switch 189 sequences the address generator 185 after the completion of a correction adjustment in the automatic system. After the adjustment is made as indicated by no correction data at the output, a pulse is provided from sequencer 187 to the address generator 185 which causes the ROM 183 to provide a new code for stepping the apparatus to a new setup adjustment. The address from the ROM 183 may be, for example, an 8-bit address which identifies the primary mode function being adjusted as was established by the buttons in the setup control panel and the monitor addresses indicating, for example, red, green or blue signals. The monitoring addresses are applied via the data bus 30 in FIG. 2 in the proper timing sequence (switch function time period) to the camera processor 21 for switching the appropriate video to be measured in the camera processor to the appropriate waveform and picture monitor lines 180a and 180d. See switch of FIG. 10. As illustrated in FIG. 14, the system may include a registration detector 195, a line level detector 196 and a focus detector 197. The switch 181 decodes the 8-bit address from the ROM 183 for applying the waveform and picture monitor signals to the proper inputs of the proper detector. For example, for setting up red registration to match green, the switch 181 decodes the red registration address from ROM 183 and couples the red camera output to the picture input and the green camera output to the waveform input of registration detector 195. The registration detector 195 may be, for example, like that discussed in application Ser. No. 841,196 of Robert Earl Flory et al., filed Oct. 11, 1977, entitled "RASTER REGISTRATION SYSTEM FOR A TELEVISION CAMERA." The raster registration detector may be, for example, like that discussed in connection with FIG. 5 of this application. The digital number from the subtraction arithmetic logic unit 32 in this referenced application of Flory et al as discussed previously may be used directly or, for example, in a microprocessor system utilized as a control signal processor 190 for developing the desired correction control signal indicating the magnitude and direction of the correction. The control processor 190 may alternatively include a digital accumulator to store the control signal which is converted to a control signal by a digital to analog converter. The chart in FIG. 13 viewed by the camera head 117 may be like that illustrated in FIG. 7 of the above-cited application of Flory et al for detecting both horizontal and vertical registration errors. The chart position and the chevrons must be accurately located with respect to the television raster. A time generated keyer 191 turns the detectors on in the right place in the raster where the chevrons are located. The keyer 191 operates to provide the line control signal. A high speed counter counts the increments between the left two marks and the increments between the right two marks. FIG. 8 of the above-cited application of Flory et al. illustrates the additional apparatus for use with the detector of FIG. 5 in that application obtaining both the left and right reference pattern measurements. The horizontal and vertical displacement errors are determined according to equations (4) and (5) in the above-cited application of Flory et al. These horizontal and vertical errors are calculated in the control processor 190 which may be a microprocessor by adding the left and right errors to obtain the horizontal errors and by subtracting these errors to obtain the vertical errors. When using the chart in FIG. 7 of the above-cited application of Flory et al., which provides for a chevron pattern at nine locations, there is provided out of the detector a horizontal and a vertical displacement error for each of the nine locations. These 18 detected error signals may then be converted to provide 10 separate corrections. This may be done, for example, in accordance with the teachings of Brian Astle, as described in British Provisional Application Ser. No. 08836/78, filed Mar. 6, 1978. From this information, the total raster alignment in terms of horizontal and vertical centering, width, height, linearity, skew and rotation may be derived. For the particular case of centering, the errors may be determined by detecting the horizontal and vertical displacement of the received signal from the center chevron in the chart of FIG. 7 of the Flory et al. application. The horizontal and vertical errors are determined by a detector as described in connection with FIG. 8 of the Flory et al. application cited above and equations (4) and (5) of that application. The output values of e which represents the peak video signals at f and g along the reference line R and e' which represents the peak video signals at h and k along R' are added and divided by 2 in the processor 190 to obtain the horizontal displacement error and subtracted (e-e') and divided by 2 to obtain the vertical displacement error. This centering error may then be applied directly to the RAM in the camera processor 21 as the data, with the appropriate address and repeat address, via gate 199. As mentioned previously, the error may be applied as one complete error signal or this error may be incremented over several time periods to correct the centering. In accordance with the arrangement described by Brian Astle in the above-cited application, the 10 corrections are applied simultaneously and incrementally such that the plurality of separate corrections are sent in a step-by-step procedure where all of the 10 corrections are applied in increments toward the total correction. The level detector 196 may be similar to that described in connection with application Ser. No. 841,194 of Robert Adams Dischert, filed Oct. 11, 1977, entitled "VIDEO SIGNAL AMPLITUDE REGISTRATION SYSTEM." The errors are similarly detected and applied to control signal processor 190.

The 8-bit address from the ROM 183 indicating the functions being measured and adjusted is coupled to the function ROM 201. The function ROM 201 provides the appropriate addresses to the RAM 54 in the camera processor 21 for the correction signals. The address generator and commutator 205 causes the ROM 201 to send sequentially four different addresses each field to accompany four sequential correction data signals from the processor 190. The address generator 205 for the embodiment described will provide a repeat address for each of the correction data signals as done previously in the setup control unit when there is correction data present from processor 190. The correction data is sent by an address-data-address signal for each control to be made. In the case where there are ten simultaneous controls provided from the control signal processor 190, it would take three fields to provide the total correction data to the camera processor 21 and the address generator would after the first four cycle period cause the ROM 201 to provide for the next field a second group of four addresses and for the third field at least two more addresses. The detectors will again test for errors. The sequence pulser 187 would be sensitive to the no error signal from the detectors for indicating an alignment and therefore cause the address generator 185 to move to a new setup step and no repeat address. When the new function to be tested requires new video, this is provided via gate 207 as discussed previously. The ROM 183 with appropriate address from address generator 185 provides test signals to be applied to the monitor lines and preset adjustments to allow performance testings to be made by the detectors. The control signal processor 190 would include a latch means for storing the same control signals until they were sequenced with the proper addresses out of the system.

It is understood that the automatic setup unit described is only by way of example and it is recognized that the control processor 190 may have a separate section for handling the 10 control functions during each field. When the new function to be tested requires new video information, the address from the ROM 183 for example via gate 207 during the switch function interval causes the monitoring circuits to switch. After the last function to be adjusted is completed, the automatic setup apparatus is turned off and the camera restored to its normal operation. The automatic setup unit can then be assigned to another camera system to be set up, or the automatic equipment may be shut down and wait for the next time a camera required adjustment. Because of the versatility of this system, additional features are easily incorporated. The system can indicate faults and marginal faults. It can also indicate trends in the adjustment that are made on a regular basis, for example, the readout correction and function may be coupled to data logging equipment to indicate an abnormal frequency of adjustment such as occurs with an impending failure.

What is claimed is:

1. A system for a television device having a source of television sync signals for providing a plurality of adjustable control signals to the device, said system comprising:
    a multiple address digital memory for storing at separate address locations separate binary signals representing the control values of said control signals;
    means responsive to said sync signals for generating multiple addresses during each television field to the memory to thereby provide during each field the separate binary signals representing the separate control values for the device;
    means coupled to said digital memory for converting said separate binary signal to separate amplitude level signals;
    a plurality of temporary storage devices coupled to control points of the television device for storing the control values between fields;
    means responsive to the television sync signals for coupling the appropriate amplitude level signal to appropriate ones of said temporary storage devices; and
    means coupled to said digital memory and responsive to digital signals with addresses from an external source for selectively changing the stored binary signals in the digital memory for adjusting the control values to the device.

2. The combination of claim 1 wherein said device is a color television camera.

3. The combination of claim 1 wherein said first mentioned means is responsive to each horizontal sync signal for providing sequentially the binary signals from the memory, and
    said second mentioned means includes means for sequentially converting the binary signals to amplitude levels and said means for coupling includes means responsive to the horizontal sync signal for sequentially coupling the amplitude level signals to the appropriate ones of said temporary storage devices.

4. A control system for providing a plurality of control signals and adjustments to a television device having television sync signals comprising:
    means including a multiple address digital memory for storing the control signals in a binary digital format for controlling the television device:
    means responsive to said sync signals for providing during each television field a plurality of addresses to said memory to thereby provide a corresponding plurality of separate binary signals out of the memory representing the separate control signals for the device,
    a digital to analog converter coupled to the output of said memory for providing an amplitude level signal representing each of the values of said control signals;
    means responsive to the television sync signals for coupling the appropriate amplitude level signal to the appropriate control for said device; and
    adjusting means coupled in a non-interfering manner to said digital memory for only changing the value of the control signals in the memory when desired and not interfering with the original adjusted value unless a change is desired.

5. The combination of claim 4 wherein said means for coupling to the appropriate control includes a storage device and sampler switches for coupling said amplitude level signals to the appropriate control storage device during each field.

6. The combination of claim 4 wherein said television device is a color television camera.

7. The combination of claim 6 including monitor means coupled via a switch means to the video output signal from said television camera and means coupled to said switch means for controlling the signal at said monitor.

8. The combination of claim 7 wherein said monitor means are located in the viewable distance from the adjusting means and said adjusting means includes means coupled to said switch means for switching said video.

9. The combination of claim 6 wherein said second mentioned means includes means for sequentially providing addresses to the memory whereby said amplitude level signals are provided sequentially from the converter.

10. The combination of claim 9 wherein said means for providing these addresses sequentially to the memory is a counter responsive to the horizontal sync signal and said means for coupling to the appropriate control includes a means responsive to the sequence of the horizontal sync signal for sequentially coupling the pulse amplitude modulating signal to an appropriate capacitor storage device.

11. The combination of claim 6 wherein said adjusting means includes means for providing modifying control values in the form of an address, the modifying data and a repeat address and said digital memory is responsive only after the reception of the repeat address for modifying the stored control signal in the digital memory.

12. A control system for setting up color television cameras comprising:
a camera head having a plurality of image pickup devices for red, green and blue video signals, said camera head having a plurality of temporary storage devices with each temporary storage device coupled to a setup control for the camera head, said camera head further including a counter means responsive to horizontal sync signals for providing control signals as a function of horizontal drive switch means coupled to the output of said counter for sequentially coupling during each television field the storage devices to a setup input of the camera head;
a camera processor including a multiple address Random Access Memory for storing in a binary code each of the control values for setting up the camera, means located in said processor and coupled to said memory for sequentially providing during the horizontal line intervals addresses to the memory to thereby sequentially provide during that interval in binary form said control values from said memory, and a digital to analog converter coupled to the output of said memory for sequentially providing during the horizontal line intervals amplitude level signals representing the control value; and
a transmission line coupled from the output of said digital to analog converter to said setup input of said camera head.

13. The combination of claim 12 including a setup control unit coupled to said camera processor for modifying the binary digital code in the memory.

14. The combination of claim 13 wherein said setup control unit provides addresses and data to the memory for modifying the setup control value at that memory location.

15. The combination of claim 14 including a monitor located within visible distance from said setup control unit for monitoring the video from the camera and said camera processor including switch means coupled to the video output from said image pickup devices for selectively coupling the video to the monitors.

16. The combination of claim 15 including switch means at said setup control unit coupled to said video switch means in said camera processor for remotely controlling the video to the monitor.

17. The combination of claim 16 including a single transmission line data bus between said setup control unit and said camera processor for coupling both the setup control signals and the switch signals.

18. A control system for a plurality of color television cameras comprising:
a plurality of cameras, each of said cameras including a multiple address Random Access Memory for storing in a binary digital code the control values for the camera and means for addressing said memory to provide said control values from said memory means to the controls in said camera; and
a setup control unit adapted to be coupled to each of said cameras for sending addresses to the memory for modifying the control values in the memory when desired and not interfering with the original adjusted value unless a correction is provided.

19. The combination of claim 18 including a monitor located within viewing distance from said setup control unit and means including a switcher in said camera for selectively coupling the video from the camera to the monitor and means located within said setup control for providing switch signals to the switcher for controlling the video from the camera.

* * * * *

UNITED STATES PATENT AND TRADEMARK OFFICE
CERTIFICATE OF CORRECTION

PATENT NO. : 4,170,024

DATED : Oct. 2, 1979

INVENTOR(S) : Robert A. Dischert

It is certified that error appears in the above-identified patent and that said Letters Patent is hereby corrected as shown below:

On the Title Sheet under Foreign Application Priority Data, that portion reading "May 24, 1977 [GB] United Kingdom ..... 22804/77" should read -- May 30, 1977 [GB] United Kingdom .... 22804/77 --; Column 11, line 12, that portion reading "132" should read -- 131 --; Column 13, line 27, that portion reading "172" should read -- 171 --.

Signed and Sealed this

Twenty-fifth Day of December 1979

[SEAL]

Attest:

SIDNEY A. DIAMOND

Attesting Officer

Commissioner of Patents and Trademarks